Aug. 15, 1933.  M. K. McCOSH  1,922,555
LIFTING DEVICE AND SUPPORTING DEVICE
Filed April 28, 1932
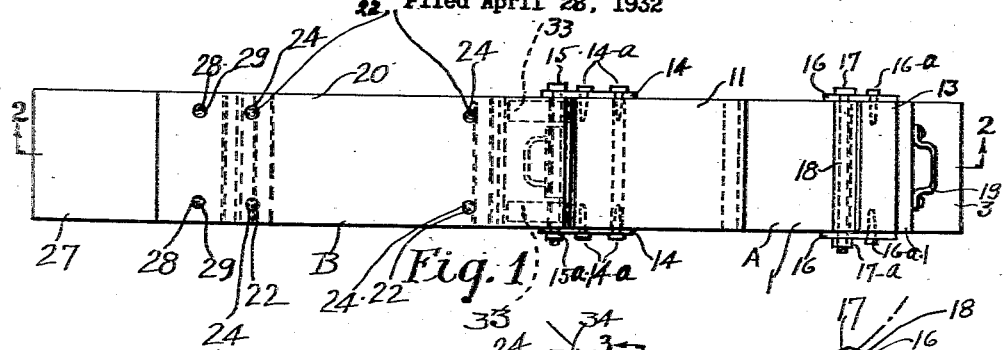
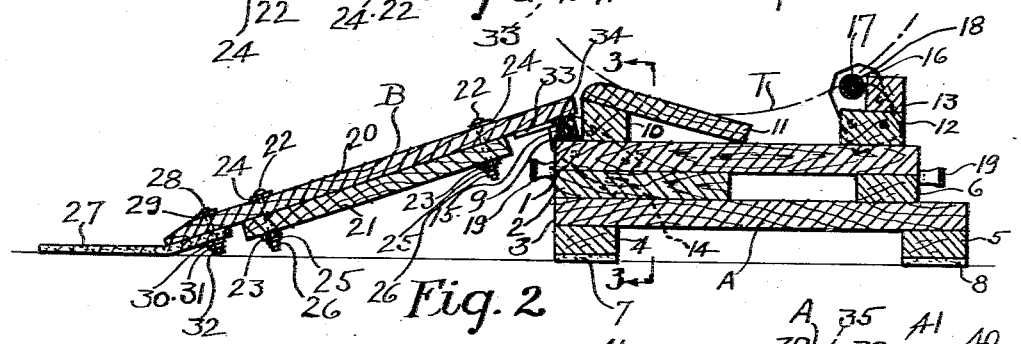
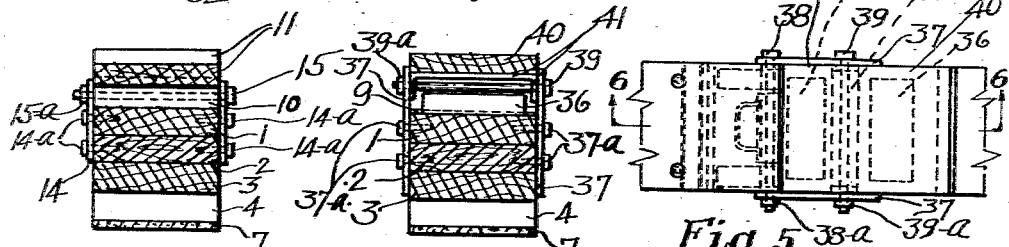
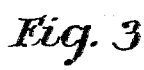
Fig. 3
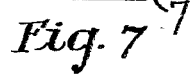
Fig. 7
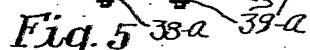
Fig. 5
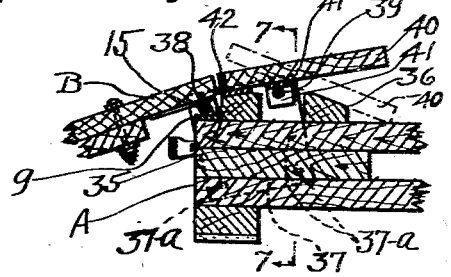
Fig. 6
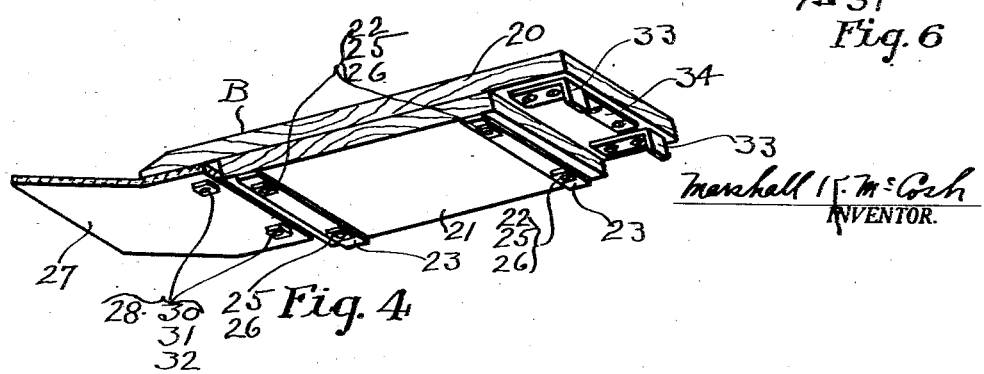
Fig. 4
Marshall K. McCosh
INVENTOR.

Patented Aug. 15, 1933

1,922,555

UNITED STATES PATENT OFFICE 1,922,555

LIFTING DEVICE AND SUPPORTING DEVICE

Marshall K. McCosh, Reisterstown, Md.

Application April 28, 1932. Serial No. 608,122

8 Claims. (Cl. 254—88)

This invention relates to lifting devices and supporting devices and has special reference to vehicle lifts and supports.

One object of the invention is to provide a body or support combining the desirable qualities of light weight, strength, rigidity and low cost, said body to receive an object such as a vehicle wheel from an incline or otherwise and support it in an elevated position.

Another object is to provide a simple, strong, rigid, sturdy lifting and supporting device and one that will occupy as little space as is consistent with the other objects so as to interfere as little as possible with the free movements of workmen beneath and about the vehicle, and one that is simple and convenient to use.

Another object is to provide an improved incline upon which the wheel of a vehicle is run on to the body of the device.

Another object is to provide means for securely attaching the incline to the body and for easily detaching it therefrom when the wheel of a vehicle rests upon said body.

Another object is to provide a "floor-plate" that will not remain distorted if bent. This flexible "floor-plate" I term a floor-mat.

Another object is to provide an improved stop.

With the above mentioned and other ends in view, which will become apparent during the course of the following description, my invention consists of novel features, arrangements and combinations set forth hereinafter, illustrated in the accompanying drawing, and particularly pointed out in the claims.

In the accompanying drawing—

Figure 1 is a plan view of what seems to me now to be the preferred embodiment of my invention. It shows the incline B attached to the body of the device, in which position the device is ready to have a wheel of a vehicle run upon it; and Figure 2 is a longitudinal section thereof on the line 2—2 of Figure 1.

Figure 3 is a cross-section of the body on the line 3—3 indicated in Figure 2.

Figure 4 is a perspective showing the under side of the incline and the attachments thereto.

Figure 5 is a plan view showing the forward part of the body of another embodiment of my invention, and showing also the rear part of the incline attached to the body; and Figure 6 is a longitudinal section thereof on the line 6—6 of Figure 5.

Figure 7 is a cross-section of the body on the line 7—7 indicated in Figure 6.

In the embodiment shown in Figures 1, 2, 3 and 4 the lower part of the body A is built up of planks 1, 2 and 3 placed horizontally, scantlings 4, 5 and 6 placed transversely of the planks, and pieces of "rubber belting" or heavy fabric 7 and 8. The "rubber belting" or fabric minimizes, or prevents, slipping on concrete and some other types of floors. Metal pieces with downward projections, more or less sharp or rough, can be used to minimize or prevent slipping on floors or on ground on which "rubber belting" or fabric slips excessively. On top of plank 1 at its forward end is a metal strip 9. On top of plank 1 and immediately behind metal strip 9 is placed scantling 10, the top of which is cut so that its surface inclines downwardly toward the rear of the body A. Upon scantling 10 rests the forward end of board 11 which inclines downwardly and rearwardly, the rear end of board 11 resting on plank 1. Almost at the extreme rear end of plank 1 is placed scantling 12, and upon scantling 12 is placed scantling 13, scantlings 12 and 13 forming the stop block.

All the parts mentioned in the preceding paragraph, namely, the lengths of planking and scantling, the "rubber belting" or fabric, the metal strip, and the board, extend the width of the body A. They are fastened together by nails (not shown) of a size to make the assemblage rigid and secure against the shocks to which it is subjected in use.

At the forward end of body A are two steel plates 14, one fastened to one side and the other to the other side of the body by screws or nails 14—a. Near the upper and forward end of each of these plates 14 is a hole, and extending through these two holes is a machine bolt 15, on the threaded end of which is screwed nut 15—a. The steel plates 14 are so positioned that the bolt 15 rests on metal strip 9 and forward of scantling 10 sufficiently to leave a space between said bolt 15 and scantling 10 for the attaching of incline B.

At the rear end of body A are two steel plates 16, one fastened to one side and the other to the other side of the body by screws or nails 16—a. Near the upper and forward end of each of these plates 16 is a hole, and extending through these two holes is a machine bolt 17, on the threaded end of which is screwed nut 17—a. Bolt 17 extends, also, through a piece of steel pipe 18 of a length slightly less than the distance between the steel plates 16, which distance is the length of scantlings 12 and 13. Steel pipe 18 has an inside diameter larger than the bolt 17 and turns easily on the bolt in the direction of its circumference.

A steel handle 19 is fastened to each end of body A by screws (not shown).

The construction of the body A is different from the construction of any other lifting device I know of, and it is a definite and decided improvement. It gives remarkable strength and rigidity in proportion to its weight and comparative freedom from cracking trouble as a result of the fact that a number of wood members are used, in some of which the grain of the wood runs transversely of the grain in adjacent pieces. Plank 2 can be placed so that its grain will run the direction of the width of the body A. In using materials other than wood great strength and rigidity is also had in proportion to the weight. This construction also permits of scantlings 4 and 5 being made longer than the width of the rest of the body A to make the body more stable under forces that may tend to tilt the body sideways. Also, in addition to this, plank 1 and board 11 (or board 40) can be increased in width and scantlings 10, 12 and 13 (or scantlings 35, 36, 12 and 13) increased in length the same extent that scantlings 4 and 5 are increased in length, without increasing the width of the rest of the body proper and, consequently, saving on weight and expense of production. Also, plank 3 can be made relatively longer and the distance between scantlings 4 and 5 increased correspondingly, without necessarily increasing the length of the rest of the body. Also, the construction is moderate in cost of material and assembling cost. The assemblage consisting of steel plates 16, bolt 17, and pipe 18 also can be omitted and scantlings 12 and 13 will act as a stop.

What I term the incline is the part of the device that serves as an incline when it is in its functioning position.

In the incline B are two boards 20 and 21 of a width equal to the width of body A. Boards 20 and 21 are held together by four carriage bolts 22. On the under side of board 21 are two narrow steel plates 23 having holes in them through which the carriage bolts 22 pass. Each of the carriage bolts extend through, respectively, flat steel washer 24, board 20, board 21, steel plate 23, lock washer 25, and nut 26. (For the sake of simplicity the lock washers 25 and nuts 26 are represented in Figure 4 by nuts only.) An improvement over previous inclines is the use of the narrow steel plates 23, which resist splitting of the wood by a transverse bending force in that they resist the bending of the wood transversely. This strengthening is particularly desirable where the floor or ground is not even.

At the forward end of the incline B is fastened a floor-mat 27 of "rubber belting" or heavy fabric by two carriage bolts 28 extending through board 20. Each of these carriage bolts 28 extends through, respectively, flat steel washer 29, board 20, flat steel washer 30, lock washer 31 and nut 32. (For the sake of simplicity the flat steel washers 30, lock washers 31 and nuts 32 are represented in Figure 4 by nuts only.) Strong flexible material other than "rubber belting" or fabric can be used; for instance, metal chain matting or other flexible metal matting.

At the rear end of the incline B are fastened narrow steel plates 33 which are bent approximately at right angles at one (rear) end. These steel plates 33 are screwed to the under side of board 20, one plate near each edge of the board. Between the plates is a narrow flat steel plate 34 which also is fastened to the under side of board 20 by screws. Plates 33 and 34 are of the same thickness. (The screws of plates 33 and 34 are shown in Figure 4 only.)

The incline can be built so that it will be self-supporting in its operating position by adding a supporting member to the under side of the rear end of the incline of a length that will reach to the floor or ground. If the incline is built in that way, it need not necessarily be fastened to the body A: it can simply be placed in position at the body A, or the body be placed in position at the incline.

In the embodiment shown in Figures 5, 6, 7 and 4 the construction of both the body A and incline B is identical with the construction shown in Figures 1, 2, 3 and 4 except that length of scantling 10, board 11 and the two steel plates 14 are omitted and the parts mentioned in the following part of this paragraph are added. Scantlings 35 and 36 extend a little less than the width of plank 1 and rest upon said plank 1. The top of scantling 35 is cut so that its top surface inclines downwardly and forwardly. This scantling 35 is immediately to the rear of metal strip 9. Scantling 36 is a little to the rear of scantling 35. The top of scantling 36 is cut so that its top surface inclines downwardly and rearwardly. (For clearness of the drawing these two scantlings 35 and 36 have been employed. It is preferable, however, to employ one piece of planking which will occupy the spaces occupied by scantlings 35 and 36 and also the space between them, so that the bolt 39 will rest on the top of the planking.) On each of the two sides of the body A is a steel plate 37 fastened thereto by nails or screws 37—a. In the upper forward corner of each of the two steel plates 37 is a hole through which extends a bolt 38 on the threaded end of which is screwed a nut 38—a. Steel plate 37 is positioned so that bolt 38 rests on metal strip 9 in the same position as in Figure 2. In the upper rear corner of each of the two steel plates 37 is another hole through which extends a bolt 39 on the threaded end of which is screwed a nut 39—a. Board 40 is of a width equal to plank 1. A little forward of midway of the length of board 40 a narrow steel plate 41 extends transversely on the bottom of the board, reaching to each of the two sides of the board, at which two sides of the board the plate 41 is bent downwardly at right angles. Through each of the downwardly extending ends of plate 41 is a hole through which extends the bolt 39, the holes being positioned so that the bolt 39 at least practically touches the under side of the horizontal part of plate 41 throughout its length. Plate 41 is fastened to board 40 by several small-diameter carriage bolts (not shown) extending through the board and plate 41 and having nuts screwed on to their threaded ends. In order to make the board 40 heavier on the forward side of bolt 39, steel plate 42, bent at right angles lengthwise extends the width of the board 40 at its forward end, one of the arms of the right angle being in contact with the under side of the board and the other arm being in contact with the forward end of the board. The plate 42 is fastened to the board 40 by screws (not shown).

The embodiment shown in Figures 1, 2, 3 and 4 is used in the following-described manner—

Where the height of the device is more than a few inches each of the front wheels of a vehicle, or each of the rear wheels, or each one of all the wheels, is run upon one of the devices simultaneously. Also, if the height of the device is such that it cannot be used by placing it in the rear of a front wheel or in front of a rear wheel, it must be placed in front of a front wheel or behind a rear wheel of a vehicle.

The rear end of incline B is held up by hand and the incline is positioned directly in front of or behind a vehicle wheel and slid along the floor or ground under the wheel until the floor-mat 27 strikes the tire in the angle made by the tire and the floor or ground. The body is then brought into position and the rear of the incline is fastened to the forward end of the body by hooking the rear end of the steel plates 33 over bolt 15. If, say, the wheel on the opposite side of the vehicle is also to be run up on one of the devices, another one of the devices is then similarly positioned at the other wheel. Then the vehicle is moved, under its own power or otherwise, so that each of the two wheels will run on to the floor-mat 27, fasten the floor-mat to the floor or ground so that it will hold the incline when the wheel strikes the incline, then run on up the incline and on to and down board 11 until it comes in contact with revolvable pipe 18. The two wheels are then held securely in the last-mentioned position, indicated by the letter T in Figure 2, by reason of the fact that the vertical center-line of each of the two wheels is between the forward and upper end of board 11 and revolvable pipe 18 and the wheel would have to move "up-hill" to change its position.

In case incline B should, by any chance, be forced against body A, that is, against scantling 10, board 20 will be in contact with scantling 10 and steel plates 33 will thereby be protected against bending.

The revolvable pipe 18 is an improvement over previous stops in that it is more effective as a stop for at least a driving wheel of a self-propelled vehicle such as an automobile when the vehicle is being operated under its own power. The pipe 18 will revolve if such a driving wheel tends to be driven over the pipe and prevent the tire from getting the traction to enable it to go over the pipe. This revolving pipe can, of course, be fitted with ball or roller bearings if desired.

With the two wheels on the bodies A of the two devices, the inclines B can be unfastened from the bodies and moved out of the way. It is a decided advantage to be able to move the inclines out of the way in that it makes it more convenient to carry on work under and about such a vehicle as an automobile, and for a mechanic or other workman to get in and out from under the automobile.

Where the two front wheels of an automobile are run up on two of the devices the rear end of the automobile can be raised if desired by, say, a hydraulic jack placed under the differential housing. The automobile is then in a stable position resting on three points and my devices keep the automobile from moving. Likewise, where the two rear wheels of an automobile are run up on the devices, the front end of the automobile can be raised by, say a hydraulic jack. Other convenient ways to make use of the device readily suggest themselves to a mechanic.

When it is desired to run the wheels back on to the floor or ground, the incline B is again attached to the forward end of the body A in the same manner as before and the vehicle moved, under its own power or otherwise, up board 11 and down incline B and over floor-mat 27 to the ground or floor.

The body A can, also, be used independently of the incline B, that is: it can be used solely as a supporting body. A vehicle, or that part of it adjacent to a wheel thereof, can be elevated by some means other than an incline such as incline B and each of one or more of the wheels of the vehicle placed or lowered on each of one or more of the bodies A, one wheel on a body. Also, the incline B can be used independently of body A, that is; it can be used in connection with some device other than body A for lifting or supporting the vehicle wheel.

One advantage of this device is that the front wheels, or the rear wheels, of a vehicle can be lifted by it close to a wall or other object where it would be inconvenient, or impossible, to employ certain other types of lifting devices or jacks.

Two of the devices can be anchored to the floor of a service or repair garage or oiling and greasing station and the front wheels, or rear wheels, of a vehicle run upon them without the necessity of further positioning the devices, or the devices can be carried to any place it is desired to use them either as supports only or to move vehicle wheels up the inclines and on to the body or support.

The embodiment shown in Figures 5, 6, 7 and 4 is used in the way described in the preceding paragraphs, board 40 tilting to the dash-and-dot line position shown in Figure 6 when the wheel moves over bolt 39 on which the board is pivoted. (When the wheel is moved up and forwardly of the board 40 and over bolt 39, board 40 again tilts to the solid-line position shown in Figure 6.) After a wheel has been moved on the body to the stop a block of wood (not shown) can be placed under the forward end of board 40 as a precaution against any movement of the board 40 and left there until it is desired to move the wheel from board 40 on to the incline B.

It is evident that the various members and parts of these embodiments can be constructed of materials other than the materials that are mentioned and described herein, and, also, that the designs and arrangements can be altered considerably without departing from my invention.

I claim:

1. A vehicle support comprising horizontal members positioned at several levels, at alternate levels being one or more longitudinally extending members, and at adjoining levels being two or more transversely extending members, two or more of said transversely extending members in a level being spaced from each other, whereby an open work support is formed, one or more of said transversely extending members constituting an elevation at the forward end of the top of said support and one or more constituting an elevation at the rear end of the top of said support, and means for detachably attaching thereto an incline upon which a vehicle wheel can be moved to the top of said support.

2. A vehicle support comprising horizontal members positioned at several levels, at alternate levels being one or more longitudinally extending members, and at adjoining levels being two or more transversely extending members, two or more of said transversely extending members in a level being spaced from each other, whereby an open work support is formed, one or more of said transversely extending members constituting an elevation at the forward end of the top of said support and one or more constituting an elevation at the rear end of the top of said support, and, associated with said support, an incline on which a vehicle wheel can be moved on to said support.

3. A vehicle support comprising horizontal members positioned at several levels, at alternate levels being one or more longitudinally extending members, and at adjoining levels being two or more transversely extending members, two or more of said transversely extending members in a level being spaced from each other, whereby an open work support is formed, and attached at the rear of the top of said support a cylindrical stop positioned horizontally and transversely of said support and positioned, also, at sufficient distance above the top of said support to stop the rearward movement of a vehicle wheel moved up an incline on to said support and rearwardly against said cylindrical stop, said cylindrical stop being attached to said support by means permitting said cylindrical stop to revolve.

4. A cylindrical stop attached at the rear of a vehicle support and at a sufficient distance above the top of said support to stop the rearward movement of a vehicle wheel run on to said support and rearwardly against said cylindrical stop, said stop being attached to said support by means permitting said stop to revolve.

5. In combination, a support having an elevated face inclined rearwardly and downwardly and having, also, a stop at the rearward end, and a separate incline adapted to have a vehicle wheel moved up it and on to said support and adapted, also, to be removed from said support.

6. A vehicle support comprising horizontal members positioned at several levels, at one level being one or more longitudinally extending members, and at adjoining levels being two or more transversely extending members, two or more of said transversely extending members in a level being spaced from each other, whereby an open work support is formed, one or more of said transversely extending members constituting an elevation at the forward end of the top of said support and one or more constituting an elevation at the rear of the top of said support, and, associated with said support, an incline on which a vehicle wheel can be moved on to said support.

7. In combination; a support for one wheel of a vehicle, said support having an elevated face inclined rearwardly and downwardly and having, also, a stop at its rearward end; and a separate incline adapted to have a vehicle wheel moved up it and on to said support and adapted, also, readily to be removed from said support.

8. In combination; a support for one wheel of a vehicle, said support having an elevated face inclined rearwardly and downwardly and having, also, a stop at its rearward end; and a separate incline adapted to be positioned at the forward end of said support and in that position have a vehicle wheel moved up it and on to said support and adapted, also, readily to be removed from said support.

MARSHALL K. McCOSH.